United States Patent [19]

van der Lely et al.

[11] 4,051,904

[45] Oct. 4, 1977

[54] SOIL CULTIVATING IMPLEMENTS

[75] Inventors: Ary van der Lely, Maasland; Cornelis Johannes Gerardus Bom, Rozenburg, both of Netherlands

[73] Assignee: C. van der Lely N. V., Maasland, Netherlands

[21] Appl. No.: 642,052

[22] Filed: Dec. 18, 1975

[30] Foreign Application Priority Data

Dec. 23, 1974 Netherlands ............... 7416758

[51] Int. Cl.² .................. A01B 33/06; A01B 49/02
[52] U.S. Cl. .................................. 172/49; 172/47; 172/68; 172/81; 172/446; 172/517; 172/552
[58] Field of Search .............. 172/59.49, 81, 517, 172/68, 679, 518, 540, 552; 273/1.5 R

[56] References Cited

U.S. PATENT DOCUMENTS

| | | | |
|---|---|---|---|
| 210,718 | 12/1878 | Smith | 172/679 |
| 1,018,298 | 2/1912 | Cheatham | 172/517 X |
| 1,262,230 | 4/1918 | Muhl | 172/517 X |
| 1,702,510 | 2/1929 | Jones | 273/1.5 R |
| 1,821,371 | 9/1931 | Ammon | 172/517 X |
| 3,885,633 | 5/1975 | van der Lely et al. | 172/68 |

Primary Examiner—Paul E. Shapiro
Attorney, Agent, or Firm—Mason, Mason & Albright

[57] ABSTRACT

A soil cultivator or harrow has a row of soil working members that are driven about upwardly extending axes to work the soil. A plant screen at each lateral side of the implement has a forward guide portion that is pivoted to the front of the frame and a rear, spring-biased portion that normally is held close to the implement's lateral sides. The guide portion of each screen is inclined with respect to the direction of travel to guide plants away from the soil working members during the forward travel of the implement. A pair of arms are pivoted adjacent their front ends to a forward portion of the main frame of the implement, and are connected at their rear ends by a transverse support. The arms are connected to the main frame intermediate their ends by a connection which permits angular adjustment of the arms about their pivots. Each end of the transverse support is connected to a further rearwardly and downwardly extending arm and a roller is supported between the further arms.

7 Claims, 3 Drawing Figures

FIG. 1

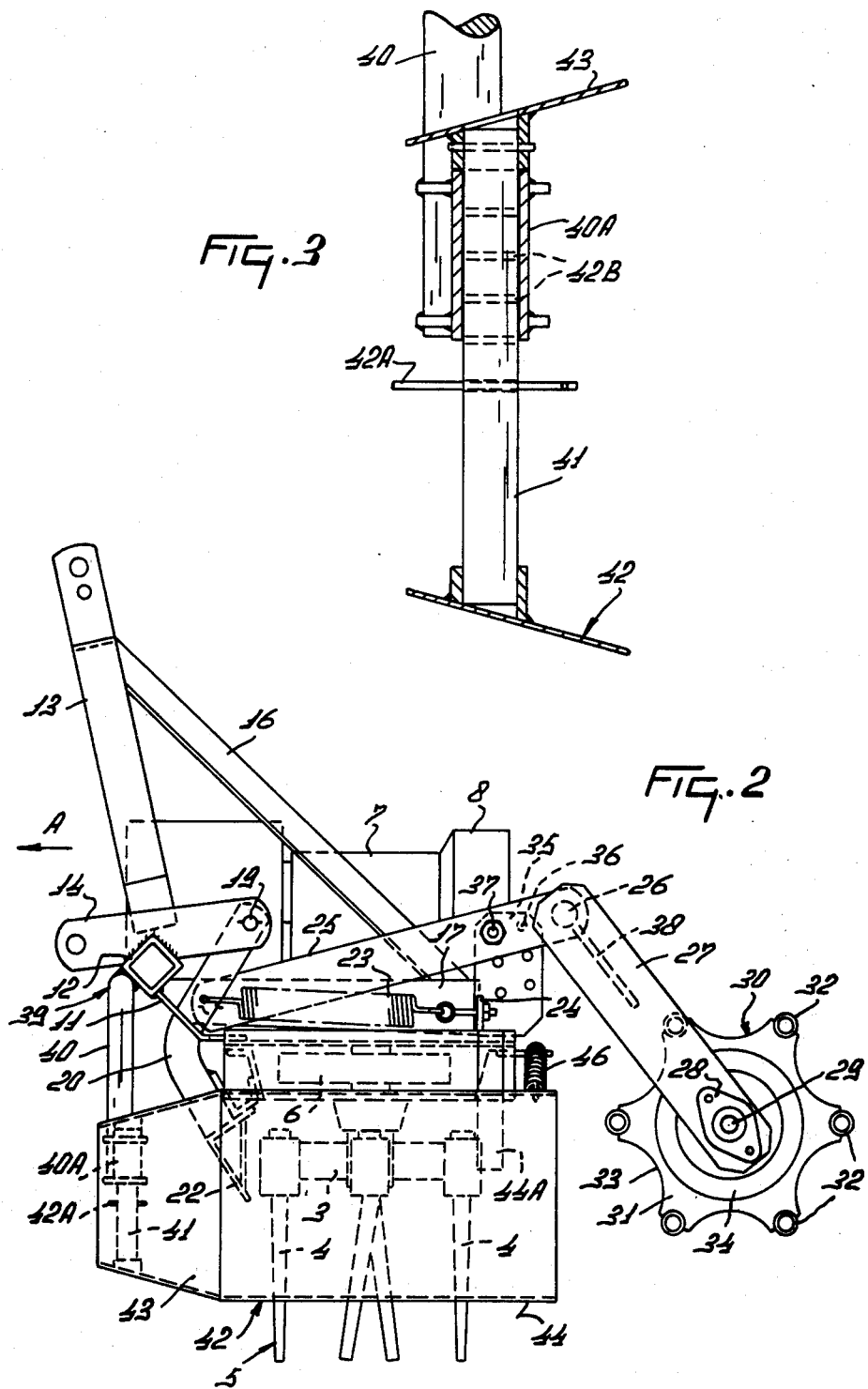

SOIL CULTIVATING IMPLEMENTS

According to the invention, there is provided a soil cultivating implement of the kind set forth, wherein each screen comprises a guide portion that extends in front of said frame portion with respect to the intended direction of operative travel of the implement, each guide portion being inclined to that direction in such a way as to tend to deflect any plant parts which it may encounter, during forward progress of the implement, outwardly away from the center of the implement.

For a better understanding of the invention, and to show how the same may be carried into effect, reference will now be made, by way of example, to the accompanying drawings, in which:

FIG. 1 is a plan view of a rotary harrow in accordance with the invention,

FIG. 2 is a side elevation of the harrow of FIG. 1 as seen in the direction indicated by an arrow II in that Figure, and FIG. 3 is a section, to an enlarged scale, taken on the line III—III in FIG. 1.

Referring to the accompanying drawings, the soil cultivating implement or machine that is illustrated therein is in the form of a rotary harrow and, for the sake of brevity, will be referred to only as a rotary harrow throughout the remainder of the descriptive portion of this specification. The illustrated rotary harrow that will hereinafter be described is particularly, but not exclusively, constructed for use in viniculture, the harrow being dimensioned to enable it to work between rows of grape vines or other climbing plants. The harrow has a frame which includes a hollow box-shaped frame portion 1 that extends substantially horizontally transverse, and normally substantially horizontally perpendicular, to the intended direction of operative travel of the harrow which is indicated by an arrow A in FIG. 2 of the drawings. A single row of five substantially vertical, or at least upright, shafts 2 are rotatably journalled in upper and lower bearings carried by the frame portion 1 in such a way that the longitudinal axis of each shaft 2 is spaced from that of its neighbour, or from those of each of its neighbours, by a distance or distances of substantially 25 centimeters. The lowermost end of each shaft 2 projects from beneath the bottom of the frame portion 1 and is there secured to the center of a corresponding substantially horizontally disposed time support 3. The opposite ends of each support 3 carry substantially vertically disposed sleeve-like tine holders in which upper fastening portions of rigid soil working tines 4 are very firmly, but releasably, secured. Each assembly that comprises one of the tine supports 3, a pair of the tine holders and a pair of the tines 4 affords a corresponding soil working or cultivating member 5, the distances between the lowermost free ends or tips of the tines 4 of each member 5 being somewhat greater than the distances between the axes of rotation of neighbouring shafts 2 so that, during the operation of the cultivator, the five soil working or cultivating members 5 work overlapping strips of soil to produce, in effect, a single strip of worked land.

Each of the shafts 2 is provided, inside the hollow frame portion 1, with a corresponding straight, toothed or spur-toothed pinion 6, the teeth of each pinion 6 being in mesh with those of the or each immediately neighbouring pinion 6 in the single row thereof. The central shaft 2 of the row of five of those shafts has an upward extension into a gear box 7 that is mounted on top of the hollow frame portion 1. The gear box 7 includes a substantially horizontal shaft 9 whose leading, with respect to the direction A, splined or otherwise keyed end projects forwardly from the front of the gear box. The shaft 9 is in driving connection with the extension of the central shaft 2 that has been mentioned above by way of transmission members contained within the gear box 7 and a change-speed gear 8 that is mounted at the back of the gear box. It is not necessary to describe the transmission members within the gear box 7 nor the change-speed gear 8 in any detail for the purposes of the present invention, it being only necessary to note that the change-speed gear 8 comprises interchangeable and/or exchangeable pinions of different sizes, an appropriate pair of those pinions being capable of being chosen to give a corresponding transmission ratio between the shaft 9 and all of the shafts 2 so that the soil working or cultivating members 5 can be rotated at a faster or slower speed without having to change the input speed of rotation applied to the shaft 9. The splined or otherwise keyed rotary input shaft 9 is constructed and arranged to be placed in driven connection with the power take-off shaft of an operating tractor or other vehicle by way of a telescopic transmission shaft (not shown) of a construction that is known per se having universal joints at its opposite ends. Supports 11 are fixedly secured to the top of the frame portion 1 and project forwardly and upwardly therefrom at two locations which are spaced at equal distances from the transverse centre of the frame portion 1. The leading and upper ends of the supports 11 are welded to substantially the bottom of a hollow support beam 12 that extends substantially horizontally parallel to the transverse length of the frame portion 1 and thus normally substantially horizontally perpendicular to the direction A. As will be evident from FIG. 2 of the drawings, the hollow support beam 12 is of square cross-section and is so arranged that, as seen in cross-section, diagonals between its opposite corners are respectively substantially vertically and substantially horizontally disposed. A coupling member or trestle 13 is fastened to the hollow support beam 12 and its top is constructed for concentration to the upper adjustable lifting link of a three-point lifting device or hitch mounted at the rear of an agricultural or horticultural tractor or other vehicle. The support beam 12 also carries two pairs of forwardly projecting apertured lugs 14 and two pairs of forwardly projecting apertured lugs 15, the latter pairs of lugs 15 being closer to each other than are the pairs of lugs 14. The pairs of apertured lugs 14 and 15 constitute attachment points for the free ends of the lower lifting links of a three-point lifting device or hitch and it is possible, by using one pair of lugs 14 and one pair of lugs 15, to connect the rotary harrow to its operating agricultural or horticultural tractor or other vehicle in such a way that it is offset to either the right or the left to some extent with respect to the path of travel of that tractor or other vehicle. The top of the coupling member or trestle 13 is connected by rigid and rearwardly and downwardly divergent ties 16 to rear regions of rigid strips 17 that extend substantially parallel to the direction A on top of the hollow frame portion 1.

Each pair of lugs 14 has a corresponding arms 20 turnably mounted between it by means of a pivot pin 19 that perpendicularly interconnects the rearmost ends of the lugs 14 concerned, the pin 19 thus extending substantially horizontally perpendicular to the direction A.

It will be seen from the drawings that the rearmost ends of the lugs 14 are located behind the hollow beam 12 with respect to the direction A and that the bent arms 20 extend downwardly therefrom and through corresponding slots 21 in the two supports 11. Lower portions of the arms 20, that are located beneath the supports 11, extend downwardly and rearwardly from top to bottom with respect to the direction A and their lowermost extremities are secured to a single screen 22 that extends substantially horizontally perpendicular to the direction A just in front of the soil working or cultivating members 5 at the level of their supports 3 and the portions of their tines 4 that are fastened in the tine holders. The arms 20 are formed, just above the slots 21 in the supports 11, with holes and helical tension springs 23 that extent substantially parallel to the direction A are stretched between those holes and tension adjustment eyes carried by upright anchorage 24 arranged on top of the frame portion 1 at the rear thereof with respect to the direction A. The screen 22 protects upper parts of the soil working or cultivating members 5 from damage by stones or other obstacles that are met with during operation of the rotary harrow but the screen 22 is forwardly deflectable about the axis defined by the aligned pins 19, against the action of the tension springs 23, to allow the release of any stone or other obstacle momentarily trapped between at least one of the members 5 and the rear of the screen 22. As can be seen in outline in FIG. 2 of the drawings, stops that co-operate with the front of the frame portion 1 are provided to prevent the screen 22 from being turned too far by the springs 23 in an anticlockwise direction about the axis defined by the pins 19.

The leading ends of the rigid strips 17 that extend substantially parallel to the direction A have the leading ends of arms 25 pivotably connected to them so as to be turnable upwardly and downwardly, alongside the corresponding strips 17, about a substantially horizontal axis that is substantially perpendicular to the direction A. The rearmost ends of the two arms 25 are rigidly interconnected by a transverse support 26 of circular cross-section that is located above and behind the frame portion 1. The transverse support 26 extends laterally beyond both of the arms 25 and its opposite ends are welded or otherwise rigidly secured to the fronts of downwardly and rearwardly inclined arms 27, the junctions between the support 26 and the arms 27 being reinforced by oblique bracing strips 38. The lowermost and rearmost free ends of the two arms 27 carry substantially horizontally aligned bearings 28 in which stub shafts 29 at the opposite ends of a rotatable supporting member in the form of a ground roller 30 are journalled. The axis of rotation of the roller 30 coincides with the aligned longitudinal axes of the two stub shafts 29 and is thus substantially horizontally perpendicular to the direction A. The roller 30 comprises three regularly spaced substantially vertical supporting plates 31, each plate 31 being formed at its periphery with six regularly spaced apart concave recesses 33 at the junctions or "peaks" between which six elongate elements 32 are rigidly mounted. The elements 32 extend parallel or substantially parallel to the axis of rotation of the roller 30 and each element 32 thus rigidly interconnects the three supporting plates 31. The two arms 27 carry corresponding screening discs 34 that are quite close to the two supporting plates 31 at the opposite ends of the roller 30, the edges of the discs 34 being located near to the opposite ends of the elongate elements 32. Two upright brackets 35 are mounted on top of the frame portion 1 at the rear ends of the two rigid strips 17, said brackets 35 being located alongside the two arms 25. Each bracket 35 is formed with two staggered rows of holes 36 in each of which rows the holes in that row are equidistant from the pivotal connection of the arm 25 concerned to the leading end of the corresponding strip 17. Each arm 25 is formed with two holes either of which can be brought into register with any chosen hole 36 in a corresponding one of the two rows of those holes and bolts 37 are provided for entry through the chosen holes in the arms 25 and the chosen holes 36. It will be appreciated that the holes that are selected for cooperation with the bolts 37 dictate the angular positions in which the arms 25 are retained about their pivotal connections to the strips 17 and thus the level of the axis of rotation of the roller 30 relative to that of the soil working or cultivating members 5. The chosen level is a principal factor in determining the depth of penetration of the tines 4 of those members 5 into the soil during operation of the rotary harrow.

Each end of the transverse beam 12 has a horizontal limb of a corresponding right-angled support 29 welded or otherwise rigidly secured to it in such a way that the other limb thereof constitutes a substantially vertically disposed and downwardly extending portion 40. The lower end of each portion 40 carries upper and lower laterally projecting brackets whose free ends, in turn, carry a corresponding substantially vertical sleeve 40A in which a corresponding vertical or substantially vertical strong pin 41 is freely turnable about its own upright longitudinal axis. Each strong pin 41 carries a corresponding screen that is generally indicated by the reference 42, the two screens 42 being located immediately beyond the opposite ends of the single row of five soil working or cultivating members 5. Each strong pin 41 is formed with a plurality of transverse bores 42B at different horizontal levels and a resilient so-called "safety" pin 42A, that is of a construction which is known per se, can have its straight limb entered through any chosen one of the bores 42B in each strong pin 41. The pins 42A and bores 42B are employed to maintain the screens 42 at chosen horizontal levels relative to the remainder of the harrow and it will be noted that FIGS. 2 and 3 of the drawings show the illustrated pin 42A entered through the lowermost one of the bores 42B. This corresponds to a lowermost possible setting of the corresponding screen 42, the pin 42A preventing the screen 42 and its strong pin 41 from rising above a level at which said pin 42A abuts against the lowermost end of the corresponding sleeve 40A. In other, higher, settings of the screens 42, the pins 42A are entered through different chosen bores 42B but are then located above the upper end of the corrresponding sleeves 40A so as to prevent the screens 42 and their strong pin 41 from moving downwardly beyond the level that corresponds to the chosen bores 42B.

Figure 1:
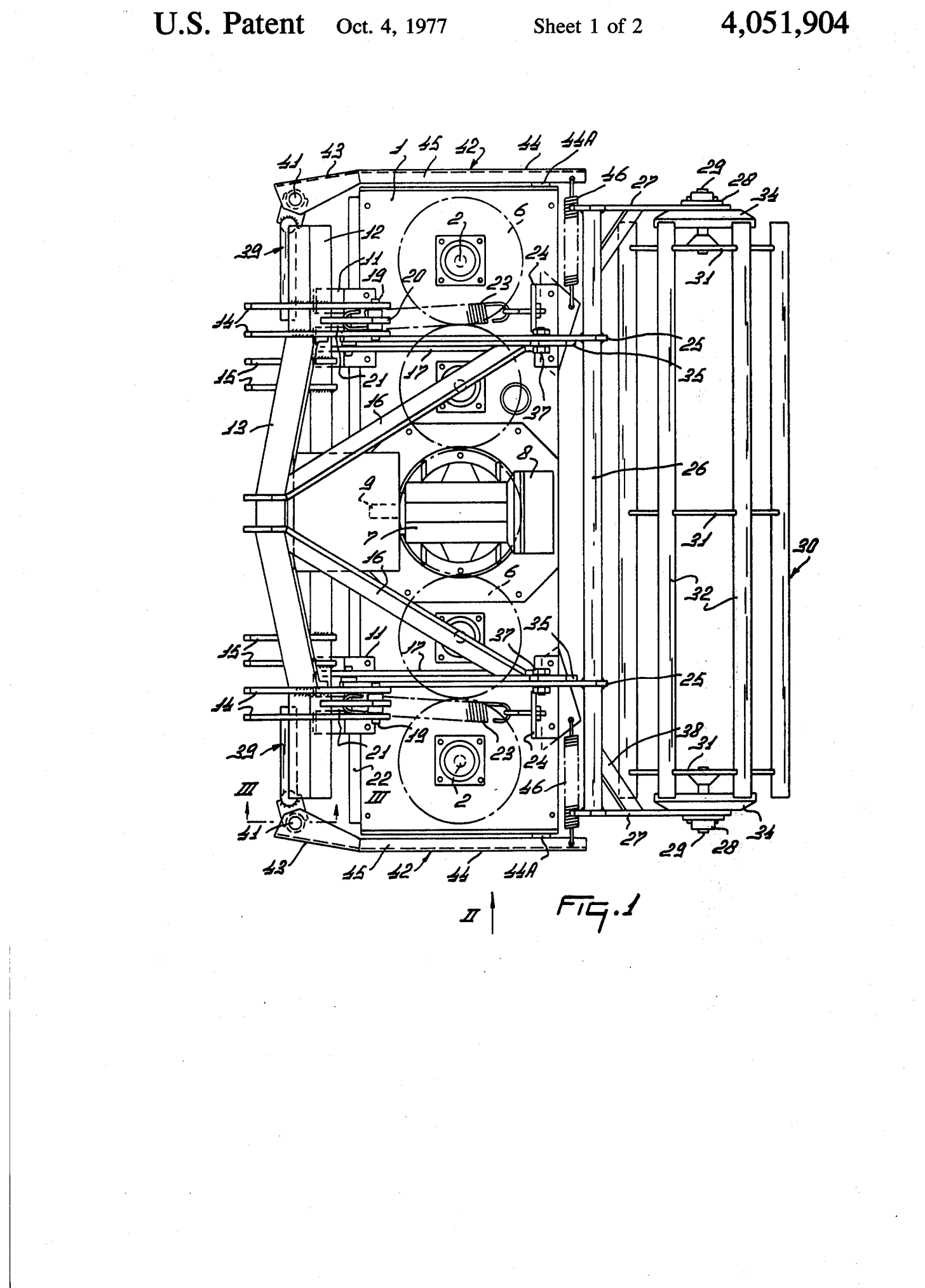

The two screens 42 are substantially symmetrically identical in construction and arrangement and each of them comprises a leading guide portion 43 whose front edge is close to the corresponding strong pin 41 and whose rear edge is in approximate register with the extreme front of the frame portion 1. It will be seen from the drawings that each portion 43 is, as seen in side elevation, of substantially trapezoidal configuration, its parallel edges being substantially vertically disposed and its non-parallel edges being bent over towards the center of the harrow to form broad portions of a rim 45, those broad portions being furnished with sockets for connection to the upper and lower ends of the corresponding strong pin 41. The broad portions of the upper and lower rims 45 are, because of the substantially trapezoidal configurations (as seen in side elevation) of the guide portions 43 of the screens 42, forwardly convergent in the direction A. The rearmost substantially vertically disposed edge of each guide portion 43 is in the form of a very shallow bend which integrally connects that portion 43 to a corresponding oblong screen portion 44. Each oblong screen portion 44 is substantially vertically disposed and normally, as illustrated, extends substantially parallel to the direction A with its leading edge substantially in register with the extreme front of the frame portion 1 and its rear edge behind the extreme back of that frame portion with respect to the direction A. The whole of each screen 42 is formed from sheet material and the aforementioned upper and lower rims 45 that are bent over towards the center of the rotary harrow are perpendicular to the general planes of the corresponding portions 43 and 44 of the screens. It will be seen from FIG. 1 of the drawings that the portions of the rims 45 that correspond to the screen portions 44 are narrow as compared with the broad portions thereof that correspond to the leading guide portions 43 of the screens 42. A rear end region of each upper rim 45 is connected to one end of a corresponding tension spring 46 whose opposite end is anchored to a bracket carried at the rear of the frame portion 1. The springs 46 normally maintain the screens 42 in contact with corresponding stops 44A but said springs 46 will stretch to allow either screen 42 to turn angularly about the axis of the corresponding sleeve 40A.

The rotary harrow that has been described has a width of substantially 1.25 meters which width substantially corresponds to the distance between rows of grape vines and rows of other climbing plants. The harrow is thus capable of cultivating the soil between such rows and, when such an operation is to be carried out, its coupling member or trestle 13 is connected to the three-point lifting device or hitch at the rear of an agricultural or horticultural tractor or other operating vehicle whose path of travel is sufficiently limited in width to render it suitable for inter-row working, the connection being made by using the attachment points at the top of the coupling member or trestle 13 and appropriate pairs of the lugs 14 and/or 15. The splined or otherwise keyed leading end of the shaft 9 is placed in driven connection with the power take-off shaft of the operating tractor or other vehicle by using a known telescopic transmission shaft (not shown) of the kind referred to above and, upon rotating the shaft 9, the five soil working or cultivating members 5 will be rotated in alternately opposite directions, that is to say, three of them will rotate in one direction and two of them will rotate in the opposite direction. The depth of penetration of the tines 4 into the soil is dictated by the pre-set level of the axis of rotation of the roller 30 and the speed of rotation of the members 5, in response to a standard speed of rotation of the power takeoff shaft of the operating tractor or other vehicle, is dictated by the employment of an appropriate pinion arrangement within the change-speed gear 8. These level and speed adjustments are made having regard to the nature and condition of the soil that is to be worked and the degree of fineness thereof that is required at the end of a cultivating operation. As the rotary harrow moves in the direction A between rows of grape vines or other climbing plants, tendrils or other tender shoots of those vines or other climbing plants are frequently engaged by the gently forwardly convergent (see FIG. 1) guide portions 43 of the two screens 42 and those portions 43, which are located in front of the frame portion 1 with respect to the direction A, accordingly push the tendrils and/or other shoots gently aside out of the path of travel of the immediately following frame portion 1 and soil working or cultivating members 5, the portions 44 of the screens 42 maintaining the deflected tender parts of the plants out of contact with elements of the harrow that would probably crush or tear them. The arms 27 by which the roller 30 is connected to the remainder of the harrow perform a generally similar function and continue to maintain any loose vine tendrils or the like from moving back into the path of travel of the harrow until potentially damaging elements thereof have passed. Inter-row cultivation can thus be effected with a very low incidence of damage to the growing vines or other plants; in particular, a minimum of damage to loose tendrils and/or other tender shoots of the vines or other climbing plants.

Any stones or other hard obstacles that the rotary harrow may encounter tend to be pushed downwardly into the soil by the screen 22 located generally in front of the frame portion 1 so that significant damage to upper regions of the members 5 is a very rare occurrence indeed. As previously mentioned, any momentarily trapped stone or other obstacle can be released because the screen 22 is forwardly yieldable against the resilient opposition of the springs 23. The screens 42, and particularly their portions 44, co-operate with the two members 5 at the end of the row thereof during the operation of the rotary harrow and, if a stone or the like is thrown hard against one of the screens 42, or if it should become momentarily trapped between that screen and the neighbouring member 5, said screen can deflect laterally in a pivotal manner about the upright axis of the corresponding sleeve 40A against the resilient opposition of the corresponding spring 46.

Although certain features of the rotary harrow that has been described and that is illustrated in the drawings will be set forth in the following claims as inventive features, it is emphasised that the invention is not necessarily limited to those features and that it includes within its scope each of the parts of the rotary harrow that has been described, and/or that is illustrated in the accompanying drawings, both individually and in various combinations.

What we claim is:

1. A soil cultivating implement comprising a frame and a plurality of rotatable tined soil working members arranged in a row supported on a portion of said frame, said portion extending transverse to the normal direction of travel and driving means connected to rotate said soil working members about upwardly extending axes during operation, adjacent soil working members being connected to rotate in relative opposite directions and work overlapping strips of ground, a screen being mounted at each lateral end of said portion and positioned to cooperate with tine means of the respective outermost soil working member of said row during rotation of that member, said screen being pivotable about an upwardly extending axis that is located adjacent the front of said frame portion and said screen comprising a guide portion at its front end, said guide portion being inclined to said direction of travel and being normally positioned to deflect plants outwardly from the rotating soil working members and a roller being connected to the frame portion by elongated arm means to said frame portion with connections intermediate the opposite ends of said arm means, connecting means retaining said arm means in chosen angular positions about the axis of a pivot connection of said arms means to said frame, said arm means including spaced apart arms that are interconnected to a transverse support adjacent the rear of said frame portion, said transverse support comprising a mounting that links said roller to the frame, opposite ends of said transverse support being connected to further arms that are inclined downwardly and rearwardly with respect to the direction of travel and said further arms retaining said roller between them.

2. An implement as claimed in claim 1 wherein said screen is pivotable about its corresponding upwardly extending axis against resilient opposite and at least one spring interconnects said frame portion to the rear of said screen, said spring biasing said screen towards said frame portion.

3. An implement as claimed in claim 1, wherein, as seen in side elevation, a portion of said screen is substantially oblong in configuration, upper and lower edges of said screen being generally perpendicularly bent over rims that extend along substantially the entire lengths of said edges.

4. An implement as claimed in claim 1, wherein a coupling member secured to said frame portion is positioned for connection to a three-point lifting device hitch of a tractor, said coupling member being interconnected to support means located at the front of said frame portion and arm members interconnecting said support means to said frame, the bottom of said coupling member having horizontally spaced apart alternative sets of attachment points positioned along the front of said frame, whereby said implement is operatively positionable in at least one offset position with respect to a prime mover that is connectable to said coupling member.

5. An implement as claimed in claim 1, wherein an upper edge of each guide portion is inclined downwardly in a direction away from said frame portion.

6. An implement as claimed in claim 1, wherein said upwardly extending axis is located in front of said frame portion with respect to the normal direction of travel.

7. A soil cultivating implement comprising a frame and a plurality of rotatable tined soil working members arranged in a row supported on a portion of said frame, said portion extending transverse to the normal direction of travel, a screen being mounted at each lateral end of said portion and positioned to cooperate with the tine means of the respective outermost soil working member of said row during rotation of that member, said screen being pivotable about an upwardly extending axis located near the front of said frame portion with respect to the normal direction of travel and said screen comprising a guide portion at its front end that is inclined to said direction of travel and positioned to deflect plants outwardly from the soil working members, a roller being positioned behind the soil working members and said roller being pivotably connected to said frame portion by spaced apart arm means, said arm means including arms that are connected to the frame portion at locations intemediate opposite ends of those arms, connection means retaining said arms in chosen angular positions about pivotable connections thereof to said frame portion, said arms being spaced apart and interconnected by a transverse support that is located adjacent the rear of said frame portion, said transverse support being elongated and further arms being coupled to the transverse support and said further arms being inclined downwardly and rearwardly with respect to the direction of travel, the rear portions of said further arms coupled to said roller and retaining same in a supporting position for the implement, the outer circumference of said roller being formed by a plurality of elongate elements that extend in general alignment with the axis of rotation of the roller, said elongate elements being mounted on spaced apart supports that have recessed positioned between adjacent screening discs being positioned adjacent said further arms at the lateral ends of said rotatable supporting member.

* * * * *